United States Patent
Doshi et al.

(10) Patent No.: US 10,795,427 B2
(45) Date of Patent: Oct. 6, 2020

(54) CONTROL OF POWER STATE TRANSITIONS

(71) Applicant: Apple Inc., Cupertino, CA (US)

(72) Inventors: Hardik K. Doshi, Los Altos, CA (US); Gopal Thirumalai Narayanan, Santa Clara, CA (US); Siddharth P. Shah, San Jose, CA (US); Joseph J. Castro, San Jose, CA (US); Craig S. Forbell, Los Gatos, CA (US); Christopher M. Aycock, San Francisco, CA (US); Varaprasad V. Lingutla, Fremont, CA (US)

(73) Assignee: Apple Inc., Cupertino, CA (US)

( * ) Notice: Subject to any disclaimer, the term of this patent is extended or adjusted under 35 U.S.C. 154(b) by 120 days.

(21) Appl. No.: 15/720,916

(22) Filed: Sep. 29, 2017

(65) Prior Publication Data
US 2018/0348850 A1  Dec. 6, 2018

Related U.S. Application Data

(60) Provisional application No. 62/514,761, filed on Jun. 2, 2017.

(51) Int. Cl.
*G06F 1/3287* (2019.01)
*G06F 1/3206* (2019.01)
*G06F 9/4401* (2018.01)

(52) U.S. Cl.
CPC .......... *G06F 1/3287* (2013.01); *G06F 1/3206* (2013.01); *G06F 9/4418* (2013.01)

(58) Field of Classification Search
CPC ................................ G06F 1/32; G06F 9/4418
See application file for complete search history.

(56) References Cited

U.S. PATENT DOCUMENTS

| | | | |
|---|---|---|---|
| 5,758,174 A * | 5/1998 | Crump | G06F 1/3203 712/E9.032 |
| 8,799,697 B2 | 8/2014 | Johnson | |
| 9,467,120 B1 * | 10/2016 | Song | G06F 1/3237 |
| 2006/0143348 A1 * | 6/2006 | Wilson | G06F 13/4291 710/110 |
| 2008/0313480 A1 | 12/2008 | Malhi | |
| 2010/0162019 A1 | 6/2010 | Kumar | |

(Continued)

*Primary Examiner* — Kim Huynh
*Assistant Examiner* — Kevin M Stewart
(74) *Attorney, Agent, or Firm* — Kowert, Hood, Munyon, Rankin & Goetzel, P.C.

(57) ABSTRACT

A method from managing power state transitions in a computing system is disclosed. A processor may initiate a change in power state from a first initial power state to a first new power state and, in response to initiating the change, send an initial notification to a system integrated circuit using a first communication channel, and deactivate the first communication based on responses to the initial notification. The processor may enter the first new power state in response to the deactivation of the first communication channel, and send a final notification to a management controller using a second communication channel. The management controller may send a message to the system integrated circuit upon receiving the final notification. The system integrated circuit may then transition from a second initial power state to a second new power state based on the message.

20 Claims, 6 Drawing Sheets

(56) References Cited

U.S. PATENT DOCUMENTS

| | | | |
|---|---|---|---|
| 2011/0320841 A1* | 12/2011 | Sinha | G06F 1/3203 |
| | | | 713/323 |
| 2012/0159218 A1* | 6/2012 | Vangala | G06F 9/5094 |
| | | | 713/323 |
| 2012/0246505 A1* | 9/2012 | Ma | G06F 1/00 |
| | | | 713/324 |
| 2015/0121519 A1* | 4/2015 | Hauke | G06F 1/26 |
| | | | 726/22 |
| 2016/0187959 A1 | 6/2016 | Nagarajan | |
| 2016/0259393 A1* | 9/2016 | Ho | G06F 1/3209 |

* cited by examiner

CONTROL OF POWER STATE TRANSITIONS

PRIORITY INFORMATION

The present application claims benefit of priority to U.S. Provisional Patent Application No. 62/514,761 entitled "CONTROL OF POWER STATE TRANSITIONS" filed Jun. 2, 2017.

BACKGROUND

Technical Field

The embodiments described herein relate to power management and control in an integrated circuit, specifically the control of power state transitions.

Description of the Relevant Art

Computing systems may include multiple integrated circuits in addition to other devices. Such integrated circuits can include processors, systems-on-a-chip (SoCs), and the like. During operation, tasks to be performed may be divided between the various integrated circuits, allowing some tasks to be performed in parallel.

In many computing applications, such as, e.g., mobile computing or wearable computing, power consumption of a computing system may be an important design consideration in order to extend battery life. To manage power consumption, integrated circuits included in the computing system may be designed to operate in a particular one of various power states based on a desired level of performance and/or desired power consumption.

During operation, an individual integrated circuit may change its power state based on a level of activity, or an external event, such as, putting a mobile computing device into a sleep mode. In other cases, changes to an integrated circuit's power state may be initiated by a power management unit (PMU), or other suitable circuit, configured to monitor power consumption of the computing system, and adjust the power states of the integrated circuits included in the computing system to maintain a desired level of power consumption.

SUMMARY OF THE EMBODIMENTS

Various embodiments of a computing system are disclosed. Broadly speaking, an apparatus and a method are contemplated, in which a processor may be configured to initiate a first change in power state from a first initial power state to a first new power state. In response to initiating the first change in power state, the processor may be further configured to send an initial notification to a system integrated circuit using a first communication channel, and deactivate the first communication channel based on responses resulting from the initial notification. The processor may be further configured to enter the first new power state in response to a determination that the first communication channel has been deactivated, and send a final notification to a management controller included in the system integrated circuit using a second communication channel in response to entering the first new power state. The management controller may be configured to send a message to the system integrated circuit in response to receiving the final notification, and the system integrated circuit is configured to transition from a second initial power state to a second new power state based on the message.

In one embodiment, the processor may be further configured to initiate a second change in power state in response to receiving a wake event, and activate the first communication channel based on a state of the system integrated circuit.

In another non-limiting embodiment, to transition from the second initial power state to the second new power state, the system integrated circuit may be further configured to halt the transition from the second initial power state to the second new power state in response to a detection of at least one active assertion.

Figure 1:
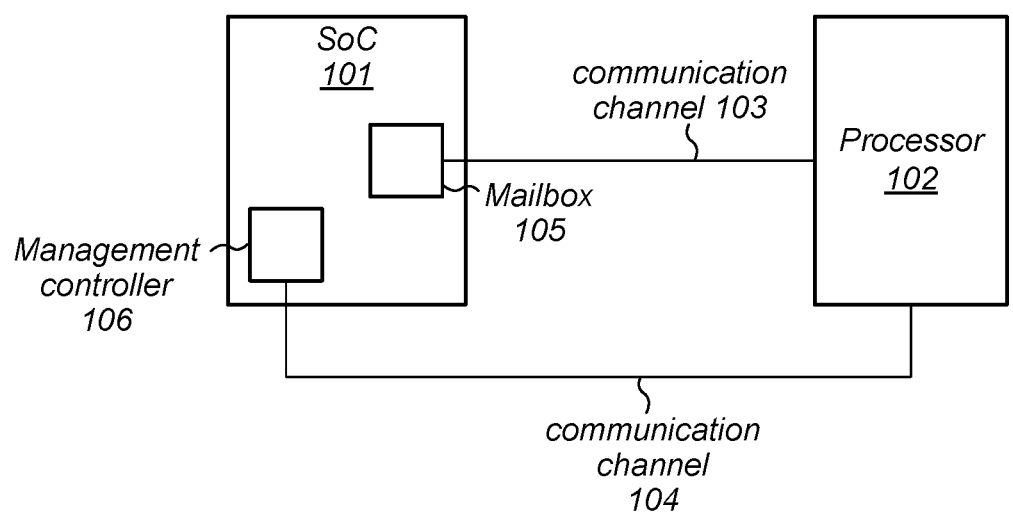
FIG. 1 is a block diagram illustrating an embodiment of a computing system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

DETAILED DESCRIPTION OF EMBODIMENTS

Computing systems may include multiple integrated circuits to allow for the performance of different operations or functions. Each integrated circuit may have different modes of operation that have different power consumption levels. Such modes of operation are commonly referred to as power states. As used and described herein, a power state is an operation mode of an integrated circuit with a particular set of voltage levels, clock frequencies, and active sub-circuit blocks included in the integrated circuit.

During operation of a computing system, different integrated circuits may transition from one power state to another based on performance needs of the computing system and/or input from a user. For example, a user can request the computing system enter a sleep mode to reduce the system to a minimum level of operation in order to converse power. In cases when the computing system is in sleep mode, the user may request the system to return to a fully-operational state (commonly referred to as "waking up").

As part of such transitions between sleep and operational modes of a computing system, integrated circuits included in the computing system may transition from one power state to another. When a particular integrated circuit transitions from an initial power state to a new power state, the transition may affect the operation of other integrated circuits. For example, if a one integrated circuit is waiting for information from another integrated circuit, which transitions to a power state where it is no longer able to communicate, the computing system may become unstable, or otherwise unusable. The embodiments illustrated in the drawings and described below may provide techniques for transitioning integrated circuits from one power state to another, while limiting the impact on the system.

Turning to FIG. 1, a block diagram of a computing system is illustrated. In the illustrated embodiment, computing system 100 includes two integrated circuits, system-on-a-chip (SoC) 101 (also referred to herein as a "system integrated circuit") coupled to processor 102 via communication channel 103 and communication channel 104.

Processor 102 may include multiple circuit blocks, and one or more processor cores (not shown) configured to execute program instructions according to a particular instruction set architecture (ISA). During execution of program instructions, Processor 102 may retrieve the program instructions from a memory or other storage device, such as, hard drives, tape drives, CD drives, DVD drives, according to a particular one of various communication protocols. In various embodiments, the processor cores of processor 102 may be configured to run a common operating system or different operating systems. In some embodiments, processor 102 is a central processing unit (CPU) of system 100.

As described below in more detail, SoC 101 may include any suitable number of circuit blocks, including mailbox 105 and management controller 106. In some embodiments, SoC 101 may also include one or more processor cores that may be configured to run an operating system different than the operating system being executing in the processor cores of processor 102. As will be discussed below with respect to FIG. 6, in some embodiments, SoC 101 may perform various functions, which may be requested by processor 102 via channel 103 and mailbox 105 such as cryptographic operations, user authentication, accessing a primary memory, etc. Although depicted as an SoC in FIG. 1, in some embodiments, integrated circuit 101 may not implement a system-on-a-chip.

During operation, both SoC 101 and processor 102 may transition from one power state to another based on performance needs, user input, and the like. In some cases, a change in power state processor 102 may affect the ability of SoC 101 to operate. As such, processor 102 may communicate changes in power state with SoC 101 via communication channel 103 and communication channel 104.

As described below in more detail, processor 102 may initially employ communication channel 103 to notify SoC 101 of an impending power state change. In some embodiments, processor 102 may store data in a register or other suitable location in mailbox 105 to send the aforementioned notification. Once the notification has been sent, processor 102 may then deactivate communication channel 103 as SoC 101, and other devices coupled to communication channel 103 (not shown) halt transactions on communication channel 103 and respond with acknowledgements of the impending deactivation of communication channel 103. Later in the process of changing power states, processor 102 may send further communication to SoC 101 via management controller 106 using communication channel 104.

Although depicted as a single wire, in various embodiments, communication channel 103 may include multiple wires. Requests and responses, collectively transactions, may be transmitted on communication channel 103 using any one of various communication protocols, such as, Peripheral Communication Interface express (PCIe), for example. In a similar fashion, communication channel 104 may include multiple wires and may support different communication protocols such as, Enhanced Serial Peripheral Interface (eSPI), for example.

It is noted that the embodiment of FIG. 1 is merely an example. In other embodiments, computing system 100 may include different numbers of integrated circuits, and different configuration integrated circuits.

As described above, when one integrated circuit in a computing system changes power state, other integrated circuits included in the computing system may also change power state. An embodiment of a method for changing power state of a computing system is depicted in the flow diagram of FIG. 2. Referring collectively to FIG. 1, and the flow diagram of FIG. 2, the method begins in block 201.

Processor 102 may then initiate a power state change (block 202). In various embodiments, the change in power state may be a result of an event, such as, e.g., a user command, the expiration of a timer, and the like. In some cases, the change in power state may result in computing system 100 entering a power state that consumes less power than a current power state of computing system 100.

Once the power state change is initiated, processor 102 may then notify SoC 101 of the impending change in power state using communication channel 103 (block 203). In some cases, communication channel 103 may employ a communication protocol that allows to devices or integrated circuit to communication using a mailbox, such as mailbox 105. In such cases, processor 102 may leave a message in mailbox 105, which may be retrieved by SoC 101 at any suitable time.

As used and described herein, a mailbox refers to a collection of registers that may be written via command included in the communication protocol. Such registers may include any suitable number of data storage circuits, such as, e.g., a latch circuit, a flip-flop circuit, or any other suitable circuit. In some embodiments, when a command is issued to write a value into one or the mailbox registers, an interrupt may be initiated that may signal the circuit block that includes the mailbox, to perform a particular task or operation. In some cases, a particular register of the mailbox may be mapped to a particular task to be initiated. Alternatively, a particular value written into a register may correspond to a particular task to be initiated Once a notification of the change in power state has been delivered to mailbox 105, processor 102 may disable communication channel 103 (block 204). In some embodiments, processor 102 may transmit a message to other devices coupled to communication channel 103 instructing them to halt further transactions on communication channel 103. Processor 102 may, in some cases, wait for an acknowledgement from the other devices before issuing a command on communication channel 103 to halt a related clock signal, power down interface circuits coupled to communication channel 103, and the like.

After communication channel has been disabled, processor 102 may then finish entering the new power state (block 205). In various embodiments, different circuit blocks included in processor 102 may be decoupled from their respective power supplies, and/or have their respective clock signals deactivated as part of the entry into the new power state.

Processor 102 may then notify management controller 106 of the completion of the power state change using communication channel 104 (block 206). In various embodiments, management controller 106 may be included in an always-on power region of SoC 101 to allow for communication between processor 102 and SoC 101 when both devices are in power states, in which communication using communication channel 103 is not permitted.

Once management controller 106 receives the notification that processor 102 has entered its new power state, SoC 101 may then enter sleep mode (block 207). As used and described herein, a sleep mode is a mode of operation of an integrated circuit, in which all but always-on voltage domains, are in a low power, or otherwise inoperable, state. Once SoC 101 enters sleep mode, the method concludes in block 208.

Figure 2:
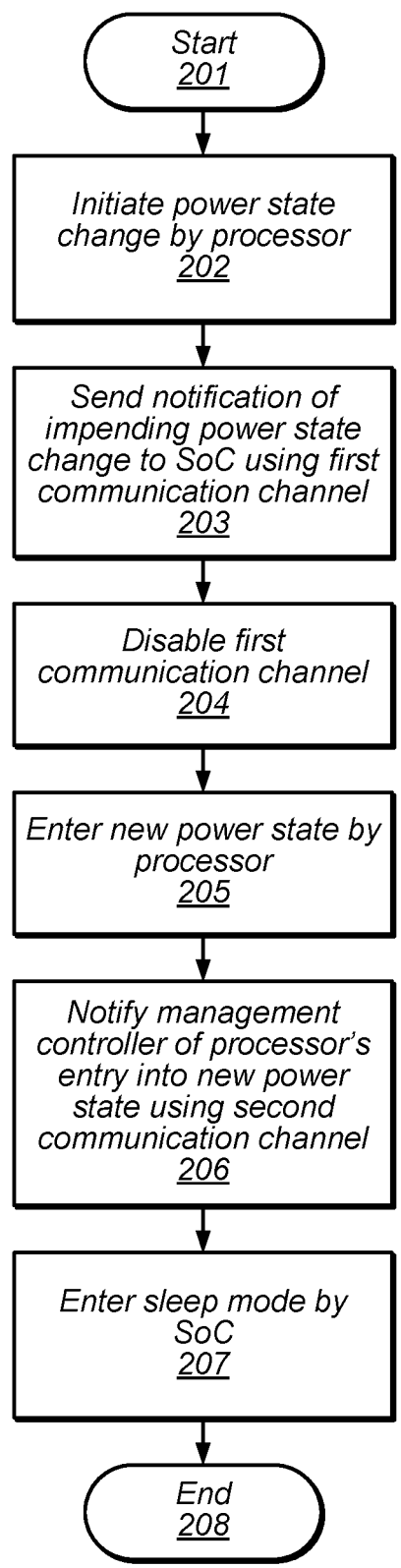
FIG. 2 is a flow diagram depicting an embodiment of a method for changing power states within a computing system.

It is noted that the embodiment of the method depicted in the flow diagram of FIG. 2 is merely an example. In other embodiments, different operations and different orders of operations may be employed.

In addition to changing the power states of various integrated circuits in a computing system to reduce the power consumption, the power states may be changed in response to the computing system receiving a wake-up event. An embodiment of a method for changing power states in response to a wake-up event is depicted in the flow diagram of FIG. 3. Referring collectively to the embodiment of FIG. 1, and the flow diagram of FIG. 3, the method begins in block 301.

A wake event may then be received by management controller 106 (block 302). In various embodiments, the wake event may be a result of a user action, such as depressing a power button. Alternatively, the wake event may be a result of a timer expiring to allow the computing system to perform a desired function at a predetermined time.

Management controller 106 may then initiate a change in power state for SoC 101 and processor 102 from a sleep mode to an active mode (block 303). In various embodiments, the transition from the sleep mode to the active mode may include activating power supplies to depowered circuit blocks, and/or reactivating clock signals that were inactive during sleep mode in both SoC 101 and processor 102.

Processor 102 may then check the state of SoC 101 using communication channel 104 (block 304). SoC 101 may send signals or notifications as various portions of SoC 101 return to an active state. In some embodiments, Processor 102 may poll SoC 101 using communication channel 104 regarding progress made in reactivating from sleep mode. The method may then depend on the state of SoC 101 (block 305).

If SoC 101 has not completed its power state change, then the method may continue from block 304 as described above. Alternatively, if SoC 101 has completed its power state transition, the processor 102 may initiate the activation of communication channel 103 (block 306). In various embodiments processor 102 may assert a signal, or set a bit in one or more registers, that indicates to devices coupled to communication channel 103 to begin sending and receiving transactions on communication channel 103.

Once communication channel 103 is active, processor 102 and SoC 101 may resume communication (block 307). In various embodiments, processor 102 and SoC 101 may employ mailbox 105 during communication over communication channel 103. The method may then end in block 308.

Figure 3:
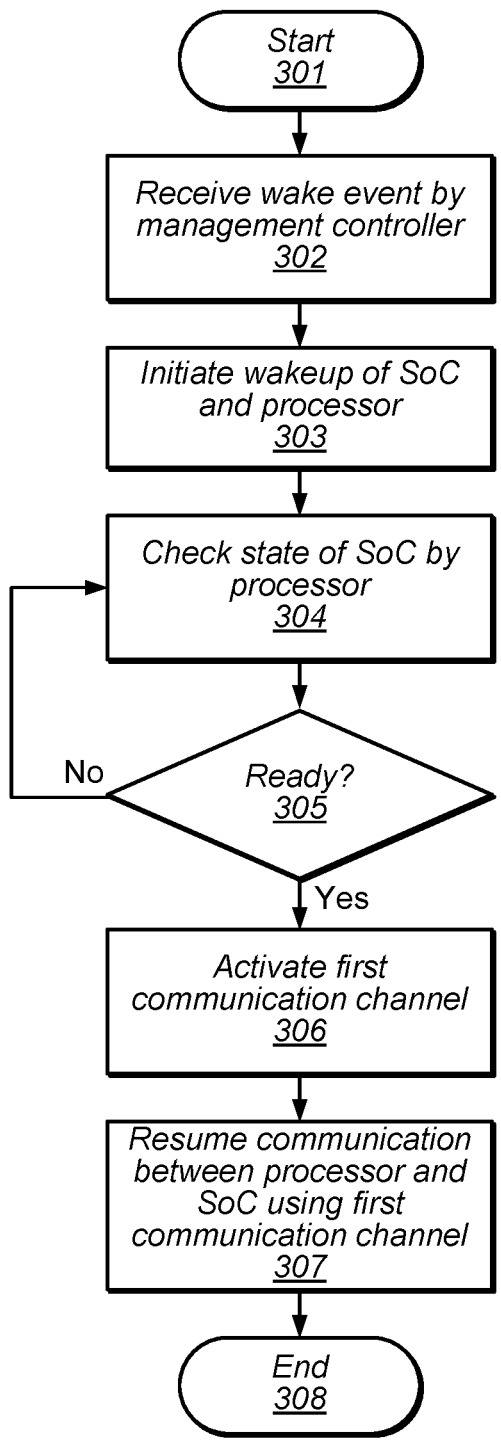
FIG. 3 is a flow diagram depicting another embodiment of a method for changing power states within a computing system.

Although the operations in the flow diagram of FIG. 3 are depicted as being performed in a sequential fashion, in other embodiments, two or more of the operations may be performed in parallel.

Prior to an integrated circuit, such as, e.g., SoC 101, assertions must be checked to verify it is safe to enter sleep mode. As used and described herein, an assertion is a parameter that when set prevents an action from occurring within an integrated circuit. An embodiment of a method for checking assertions is depicted in the flow diagram of FIG. 4. In various embodiments, the embodiment depicted in FIG. 4 may be included in operations performed in block 207 as illustrated in FIG. 2. Referring collectively to the embodiment of FIG. 1, and the flow diagram of FIG. 4, the method begins in block 401.

SoC 101 may then check for any assertions (block 402). In various embodiments, the assertions may take the form or one or more data bits stored in a register or other suitable storage location. SoC 101 may check multiple storage locations to detect if assertions have been set. The method then depends on whether any assertions were discovered (block 403).

If one or more assertions were discovered, the SoC 101 may halt further action to enter sleep mode (block 404). The method may then proceed from block 402 as described above.

Alternatively, if no assertions were detected, SoC 101 may complete the remaining operations for entry into sleep mode (block 405). As described above, such operations may include, without limitation, deactivating internal power supplies, clock signals, bias circuits, and the like. The method may then conclude in block 406.

Figure 4:
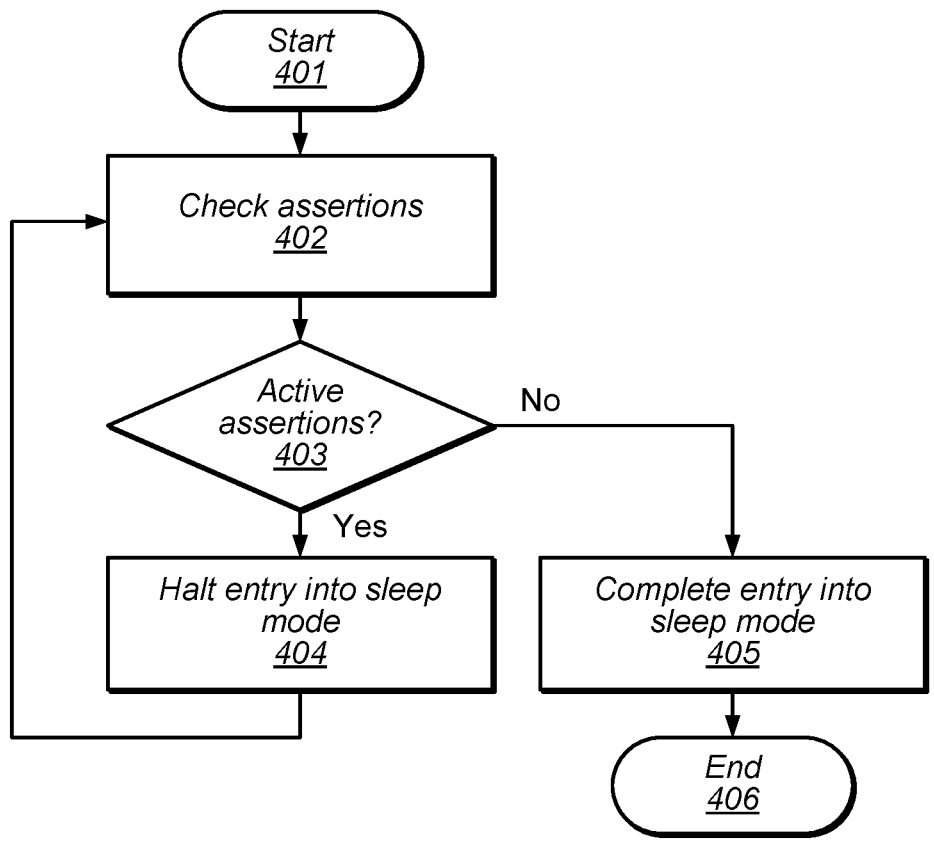
FIG. 4 is a flow diagram depicting an embodiment for checking assertions before completing a power state change.

It is noted that embodiment depicted in the flow diagram of FIG. 4 is merely an example. In other embodiments, different operations and different orders of operations may be employed.

Figure 5:
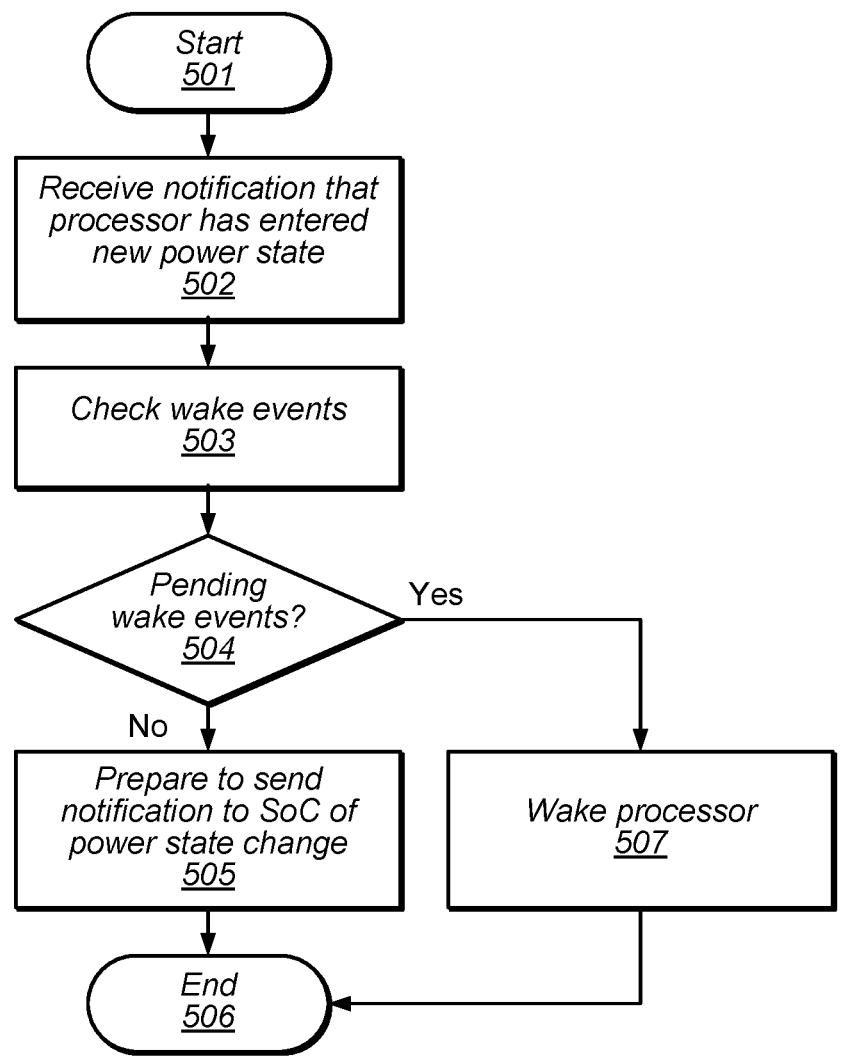
FIG. 5 is flow diagram depicting an embodiment of a method for processing events during a power state transition.

As the process of changing the power state of a computing system proceeds, events may occur, which may result in halting the transition to the new power state. The flow diagram illustrated in FIG. 5 depicts an embodiment of a method for processing events during a power state transition. In various embodiments, the method depicted in flow diagram of FIG. 5 may correspond to one of various operations performed as part of block 206 as illustrated in FIG. 2. The method begins in block 501.

Management controller 106 may then receive a notification that processor 102 has entered a new power state (block 502). In various embodiments, the notification may be sent from processor 102 to management controller 106 using communication channel 104. Communication channel 104 may employ any suitable communication protocol, such as, Enhanced Serial Peripheral Interface (eSPI), for example.

Management controller 106 may then check for pending wake events (block 503). As used and described herein, a wake event is an event detected by a computing system that indicated the computing system should transition to a power state capable of performing a particular task. For example, in a mobile computing device, a wake event may include, without limitation, plugging the mobile computing device into AC power, depressing one or more keys on a keyboard associated with the mobile computing device, and the like. The method may then depend on whether there are any pending wake events (block 504).

If there are pending wake events, management controller 106 may send a signal to processor 102 to wake-up (block 507). In various embodiments, management controller 106 may use communication channel 104 to send the wake-up signal to processor 102. Once processor 102 has received the wake-up signal, the method may conclude in block 506.

Alternatively, if there are no pending wake events, management controller may prepare to send a notification to SoC 101 to change from an initial power state to a new power state (block 505). In various embodiments, the power consumption of SoC 101 may be less when operating in the new power state relative to when operating in initial power state. As described below in more detail, management controller 106 may employ a communication bus internal to SoC 101, or any other suitable communication method, to send the notification. The method may then conclude in block 506.

It is noted that the embodiment depicted in the flow diagram of FIG. 5 is merely an example. In other embodiments, different operations or different combinations of operations may be employed.

Figure 6:
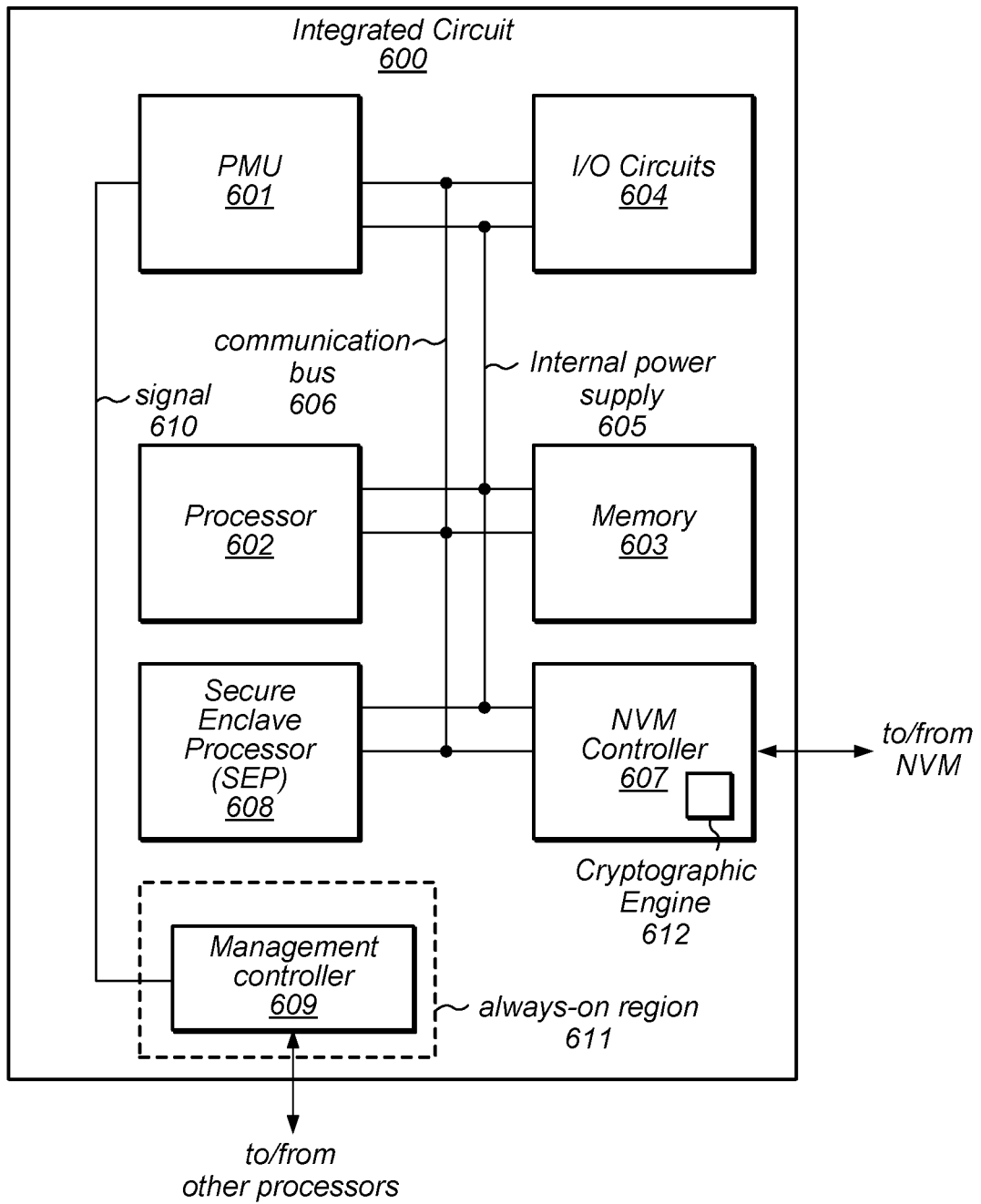
FIG. 6 is a block diagram depicting an embodiment of an integrated circuit.

Turning to FIG. 6, an embodiment of an integrated circuit is illustrated. In various embodiments, integrated circuit 600 may correspond to SoC 101 as illustrated in the embodiment of FIG. 1. In the illustrated embodiment, integrated circuit 600 includes power management unit (PMU) 601, processor 602, memory 603, input/output (I/O) circuits 604, NVM controller 607, secure enclave processor 608, and management controller 609. Individual circuit blocks, such as, e.g., processor 602, may be decoupled from internal power supply 605, or otherwise deactivated, as part of a power state change of integrated circuit 600.

PMU 601 may include voltage regulation and associated control circuits (not shown) configured to generate internal power supply 605 using and external power supply (not shown). Although a single internal power supply is depicted in the embodiment of FIG. 6, in other embodiments, any suitable number of internal power supplies may be employed. In some cases, each internal power supply may have a different voltage level. In some embodiments, PMU 601 may communicate with management controller 609 regarding changes in the power state of integrated circuit 600.

Memory block 603 may include any suitable type of memory such as a Dynamic Random Access Memory (DRAM), a Static Random Access Memory (SRAM), a Read-only Memory (ROM), Electrically Erasable Programmable Read-only Memory (EEPROM), or a non-volatile memory, for example. It is noted that in the embodiment of an integrated circuit illustrated in FIG. 6, a single memory block is depicted. In other embodiments, any suitable number of memory blocks may be employed.

Processor 602 may include one or more processor cores configured to execute program instructions according to a particular instruction set architecture (ISA). In some embodiments, processor 602 supports a different ISA (e.g., ARM) than the ISA supported by processor 102 (e.g., x86). During execution of program instructions, Processor 602 may retrieve the program instructions from memory 603 using communication bus 606. In various embodiments, communication bus 606 may be configured to allow requests and responses to be exchanged between processor 602, memory 603, and I/O circuits 604 according to a particular one of various communication protocols.

I/O circuits 604 may be configured to coordinate data transfer between integrated circuit 600 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, I/O circuits 604 may be configured to implement a version of Universal Serial Bus (USB) protocol or IEEE 1394 (Firewire®) protocol.

Non-volatile memory (NVM) controller 607 may be configured to facilitate accessing data stored in an external NVM, which may include various user data and system files. Controller 607 may generally include circuitry for receiving requests for memory operations from the other components such as processor 602 and for accessing the NVM to service those requests. Accordingly, controller 607 may include circuitry for issuing read and write commands to the NVM, performing logical-to-physical mapping for data in the NVM, etc. In some embodiments, controller 607 includes circuitry configured to handle various physical interfacing (PHY) functionality to drive signals to the NVM. In the illustrated embodiment, NVM controller 607 includes circuitry (shown as cryptographic engine 612) configured to encrypt data being written to the NVM by NVM controller 607 and decrypt data being read from the NVM by controller 607. Cryptographic engine 612 may implement any suitable encryption algorithm such as Data Encryption Standard (DES), Advanced Encryption Standard (AES), Rivest Shamir Adleman (RSA), Elliptic Curve Cryptography (ECC), etc. In some embodiments, the NVM is the primary storage for the computing device depicted in FIG. 1. In such an embodiment, processor 102 may not be able to access the NVM directly; rather, processor 102 is configured to request that SoC 101 read and write data to the NVM using NVM controller 607.

Secure enclave processor (SEP) 608 is a secure circuit that may be configured to perform sensitive operations. As used herein, the term "secure circuit" refers to a circuit that protects an isolated, internal resource from being directly accessed by an external circuit such as processor 602 and I/O circuits 604. This internal resource may be memory that stores sensitive data such as cryptographic keys and/or user authentication data (e.g., passcodes, biometric data, etc.). This internal resource may also be circuitry that performs services/operations associated with sensitive data such as cryptographic circuitry configured to perform encryption and decryption with keys. In some embodiments, SEP 608 handle performance of various cryptographic operations, which can be requested by processor 102 via mailbox 105. In some embodiments, SEP 608 is configured to authenticate a user of the computing device depicted in FIG. 1 by comparing authentication information maintained in SEP 608 with information collected for a user attempting to authenticate. In such an embodiment, SEP 608 may perform the authentication at the request of processor 102.

Management controller 609 may be configured to communicate with other integrated circuits and processors. Such communication may include, without limitation, information relating to the power state of the other integrated circuits and processors. Additionally, management controller 609 may initiate power state changes for integrated circuit 600. For example, management controller 609 may send signal 610 to PMU 601 indicating that a voltage level on an internal power supply 605 should be reduced. Alternatively, or in addition to, management controller 609 may send a signal to a clock generation circuit (not shown) to change a frequency of a clock signal or other signal suitable as a timing reference for one or more of the circuit blocks included in integrated circuit 600.

Management controller 609 may be designed according to one of various design styles. For example, in some embodiments, management controller 609 may include any suitable combination of logic, sequential logic circuit or state machines, configured to implement a set of desired functions. Alternatively, management controller 609 may be implemented as a general-purpose processor configured to execute software or program instructions retrieved from a memory or other suitable storage device or location.

In various embodiments, management controller 609 is included in always-on region 611. As used herein, an always-on region is a voltage domain included within an integrated circuit that, once power is applied to the integrated circuit, remains active while the integrated circuit is in a sleep mode or low power mode until power is removed from the integrated circuit. By including management controller 609 in always-on region 611, management controller 609 may, in various embodiments, be able to control the power state of integrated circuit 600 even when all other circuit blocks are in a sleep mode or powered down state. Although management controller 609 is the only circuit block included in always-on region 611, in other embodiments, any suitable number and type of circuit blocks may be included in always-on region 611.

It is noted that the embodiment illustrated in FIG. 6 is merely an example. In other embodiments, different circuit blocks and different arrangements of circuit blocks are possible and contemplated.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An, apparatus, comprising:
a system integrated circuit including a management controller;
a processor configured to:
initiate a first change in power state from a first initial power state to a first new power state;
in response to initiating the first change in power state:
send an initial notification to the system integrated circuit using a first communication channel; and
deactivate the first communication channel based on responses resulting from the initial notification;
enter the first new power state in response to a determination that the first communication channel has been deactivated; and
in response to entering the first new power state, send, to the management controller using a second communication channel, a second notification indicating the processor has entered the first new power state; and
wherein the management controller configured to:
send a message to the system integrated circuit in response to receiving the second notification; and
wherein the system integrated circuit is configured to transition from a second initial power state to a second new power state based on the message.

2. The apparatus of claim 1, wherein the processor is further configured to:
initiate a second change in power state in response to receiving a wake event; and
activate the first communication channel based on a state of the system integrated circuit.

3. The apparatus of claim 1, wherein to transition from the second initial power state to the second new power state, the system integrated circuit is further configured to halt the transition from the second initial power state to the second new power state in response to a detection of at least one active assertion.

4. The apparatus of claim 1, wherein the management controller is further configured to generate a wake signal for the processor in response to a determination there is at least one wake event pending.

5. The apparatus of claim 1, wherein to send the second notification to the management controller using the second communication channel, the processor is further configured to send the second notification using an Enhanced Serial Peripheral Interface (eSPI) communication protocol.

6. The apparatus of claim 1, wherein to send the initial notification to the system integrated circuit using the first communication channel, the processor is further configured to send the initial notification using a Peripheral Communication Interface express (PCIe) communication protocol.

7. A method, comprising:
initiating, by a processor executing a first operating system, a first change in power state from a first initial power state to a first new power state;
in response to initiating the first change in the power state:
sending, by the processor using a first communication channel, an initial notification to a system integrated circuit including at least one processor core executing a second operating system; and
deactivating the first communication channel based on responses resulting from the initial notification;

entering, by the processor, the first new power state in response to determining the first communication channel has been deactivated;
in response to entering the first new power state, sending, by the processor using a second communication channel, a second notification indicating the processor has entered the first new power state to a management controller included in the system integrated circuit;
sending, by the management controller, a message to the system integrated circuit in response to receiving the second notification; and
transitioning, by the system integrated circuit, from a second initial power state to a second new power state based on the message.

8. The method of claim 7, further comprising initiating, by the processor, a second change in power state in response to receiving a wake event, and activating the first communication channel based on a state of the system integrated circuit.

9. The method of claim 7, wherein transitioning, by the system integrated circuit, from the second initial power state to the second new power state includes halting the transitioning, by the system integrated circuit, from the second initial power state to the second new power state in response to detecting at least one active assertion.

10. The method of claim 7, further comprising, generating, by the management controller, a wake signal for the processor in response to determining at least one wake event is pending.

11. The method of claim 7, further comprising sending, by the processor, the initial notification to the system integrated circuit using a Peripheral Communication Interface express (PCIe) communication protocol.

12. The method of claim 7, further comprising, sending, by the processor, the second notification to the management controller using an Enhanced Serial Peripheral Interface (eSPI) communication protocol.

13. The method of claim 7, wherein sending, by the processor, the initial notification includes storing a value in a mailbox included in the system integrated circuit.

14. A system, comprising:
a first integrated circuit;
a second integrated circuit configured to:
  initiate a first change in power state from a first initial power state to a first new power state;
  in response to initiating the first change in power state:
    send an initial notification to the first integrated circuit using a first communication channel; and
    deactivate the first communication channel based on responses resulting from the initial notification;
    enter the first new power state in response to a determination that the first communication channel has been deactivated; and
  in response to entering the first new power state, send, using a second communication channel, a second notification to the first integrated circuit, wherein the second notification indicates that the second integrated circuit has entered the first new power sate; and
wherein the first integrated circuit is configured to transition from a second initial power state to a second new power state based on the second notification.

15. The system of claim 14, wherein the second integrated circuit is further configured to:
initiate a second change in power state in response to receiving a wake event; and
activate the first communication channel based on a state of the first integrated circuit.

16. The system of claim 14, wherein to transition from the second initial power state to the second new power state, the first integrated circuit is further configured to, in response to a detection of at least one active assertion, halt the transition from the second initial power state to the second new power state.

17. The system of claim 14, wherein the first integrated circuit is further configured to generate a wake signal for the second integrated circuit in response to a determination there is at least one wake event pending.

18. The system of claim 14, wherein to send the second notification to the first integrated circuit using the second communication channel, the second integrated circuit is further configured to send the second notification using an Enhanced Serial Peripheral Interface (eSPI) communication protocol.

19. The system of claim 14, wherein to send the initial notification to the first integrated circuit using the first communication channel, the second integrated circuit is further configured to send the initial notification using a Peripheral Communication Interface express (PCIe) communication protocol.

20. The system of claim 14, wherein to send the initial notification, the second integrated circuit is further configured to store a value in a mailbox included in the first integrated circuit.

* * * * *